(12) United States Patent
Chen et al.

(10) Patent No.: US 11,187,640 B2
(45) Date of Patent: Nov. 30, 2021

(54) POWDER PARTICLE SIZE DISTRIBUTION MEASURING EQUIPMENT, POWDER DISPERSING DEVICE, AND METHOD OF MEASURING POWDER PARTICLE SIZE DISTRIBUTION

(71) Applicant: Lighttells Corp., Ltd., Zhubei (TW)

(72) Inventors: Chia-Chung Chen, Zhubei (TW); Shang-Te Tu, Zhubei (TW)

(73) Assignee: LIGHTTELLS CORP., LTD., Zhubei (TW)

( * ) Notice: Subject to any disclaimer, the term of this patent is extended or adjusted under 35 U.S.C. 154(b) by 21 days.

(21) Appl. No.: 16/883,406

(22) Filed: May 26, 2020

(65) Prior Publication Data

US 2021/0018419 A1 Jan. 21, 2021

(30) Foreign Application Priority Data

Jul. 19, 2019 (TW) ................................. 108125740

(51) Int. Cl.
*G01N 15/02* (2006.01)
*G01D 11/18* (2006.01)
*G01D 11/24* (2006.01)

(52) U.S. Cl.
CPC ......... *G01N 15/0255* (2013.01); *G01D 11/18* (2013.01); *G01D 11/24* (2013.01); *G01N 2015/0261* (2013.01)

(58) Field of Classification Search
CPC ............... G01N 15/02; G01N 15/0255; G01N 2015/0261; G01N 2015/0019; G01N 2015/0042; G01D 11/18; G01D 11/24
See application file for complete search history.

(56) References Cited

U.S. PATENT DOCUMENTS 6,457,345 B1 * 10/2002 Gebert ..................... G01N 3/56
73/592
2018/0252626 A1 * 9/2018 Kojovic .................. G01N 3/40

FOREIGN PATENT DOCUMENTS

TW 201108980 * 3/2011 .............. A47J 42/02

* cited by examiner

*Primary Examiner* — Benjamin R Schmitt
(74) *Attorney, Agent, or Firm* — Muncy, Geissler, Olds & Lowe, P.C.

(57) ABSTRACT

A powder dispersing device of a powder particle size distribution measuring equipment has a base, an elastic force generating assembly and a first housing. The elastic force generating assembly includes a bumping piece, a force applying board and a power transmission assembly. Two ends of the power transmission assembly are respectively connected to the bumping piece and the force applying board. When the force applying board is applied with a first displacement, the power transmission assembly actuates the bumping piece to generate a second displacement which enables the bumping piece to have a first elastic force. The first housing is formed with a through hole on a side surface for one end of the force applying board to extend out. The first elastic force of the bumping piece triggers the bumping piece to strike on any surface facing toward the inside of the first housing and touching the other end of the bumping piece.

13 Claims, 7 Drawing Sheets

POWDER PARTICLE SIZE DISTRIBUTION MEASURING EQUIPMENT, POWDER DISPERSING DEVICE, AND METHOD OF MEASURING POWDER PARTICLE SIZE DISTRIBUTION

TECHNICAL FIELD

The present invention relates to an auxiliary measuring device of a measuring equipment, especially relates to a powder dispersing device of a powder particle size distribution measuring equipment.

BACKGROUND

Many people have a habit of coffee drinking, the flavor of coffee itself is not only related to the differences of roasting degree but also related to the grinding fineness of coffee. The higher degree of the grinding fineness means the more surface area of the coffee is contacted with the hot water while brewing coffee. As a result, more substances are extracted during the same time period to add more flavors to the coffee. Therefore, to taste coffee powder with different grinding fineness, it is necessary to distinguish the differences of grinding fineness of coffee powder for brewing. How to measure the particle size distribution of coffee powder has become one of the technical issues of the belonged technology area.

At present, the development of most of the known equipment or devices for measuring the coffee powder particle size distribution are based on the theory of vibration or air-blowing to disperse the coffee powder under measurement. It is required to disperse the coffee powder of agglomeration before measurement to avoid big bias of the particle size distribution of the coffee powder. However, these conventional equipment or devices usually have a large volume and weight and cause inconvenience to operation and are not good for hand carrying and not be able to be used together with a handheld coffee powder particle size distribution measuring device. It has become a huge problem to coffee taster and is not good for execution of international coffee brewing competition.

SUMMARY

In view of the above issues, this application proposes a powder dispersing device of a powder particle size distribution measuring equipment in one embodiment. The powder dispersing device is able to directly and effectively disperse the powder of agglomeration and also can be used together with a handheld powder particle size distribution measuring device to make the judgement of powder particle size distribution in a more convenient manner and has advantages of small volume and light weight to be carried to any occasions.

In one embodiment, the disclosed powder dispersing device of a powder particle size distribution measuring equipment comprises a base, an elastic force generating assembly mounted on the base, and a first housing. The elastic force generating assembly comprises at least one bumping piece, at least one force applying board and a power transmission assembly. One end of the power transmission assembly is connected to one end of the bumping piece and the other end of the power transmission assembly is connected to one end of the force applying board, and a first displacement applied to the force applying board enables the power transmission assembly to actuate the bumping piece to generate a second displacement which enables the bumping piece to have a first elastic force. The first housing has one end coupled with the base and has a side surface formed with a through hole, and the elastic force generating assembly is covered inside the first housing with the other end of the force applying board extending out the through hole. The first elastic force triggers the bumping piece to strike on a plane facing toward the inside of the first housing and touching the other end of the bumping piece.

In one embodiment, in the disclosed powder dispersing device of a powder particle size distribution measuring equipment, the one end of the bumping piece connected to the power transmission assembly is pivoted to one wall surface of the elastic force generating assembly, the power transmission assembly has a first torsional spring having one end fixed onto the wall surface of the elastic force generating assembly and the other end fixed onto the bumping piece, and the first elastic force is generated by the second displacement of the first torsional spring.

In one embodiment, in the disclosed powder dispersing device of a powder particle size distribution measuring equipment, the power transmission assembly enables the force applying board to have a second elastic force when the first displacement is applied.

In one embodiment, in the disclosed powder dispersing device of a powder particle size distribution measuring equipment, the one end of the force applying board connected to the power transmission assembly is pivoted to one wall surface of the elastic force generating assembly, the power transmission assembly has a second torsional spring having one end fixed onto the wall surface of the elastic force generating assembly and the other end fixed onto the force applying board, and the second elastic force is generated by the first displacement of the second torsional spring.

In one embodiment, the disclosed powder dispersing device of a powder particle size distribution measuring equipment further comprises a cover box having a closed end and an opening end and being adapted to be coupled with the first housing to cover the upside of the plane facing toward the inside of the first housing and touching the other end of the bumping piece.

In one embodiment, in the disclosed powder dispersing device of a powder particle size distribution measuring equipment, the opening end of the cover box falls inside the upper boarder of the first housing of the powder dispersing device after the cover box is coupled to the first housing.

In one embodiment, the closed end is shaped to be downward curved and the peripheral surface of the closed end surrounding the center surface of the closed end is lower than the center surface of the closed end.

In one embodiment, the closed end is shaped to have a curve of a sphere.

In one embodiment, the plane facing toward the inside of the first housing and touching the other end of the bumping piece is a bottom surface of a tray disposed at the other end of the first housing.

In another embodiment, this application discloses a powder particle size distribution measuring equipment comprising a base, an elastic force generating assembly mounted on the base, a first housing, a platform, and a handheld powder particle size distribution measuring device. The elastic force generating assembly comprises at least one bumping piece, at least one force applying board and a power transmission assembly. One end of the power transmission assembly is connected to one end of the bumping piece and the other end of the power transmission assembly is connected to one end of the force applying board, and a first displacement applied to the force applying board enables the power transmission assembly to actuate the bumping piece to generate a second displacement which enables the bumping piece to have a first elastic force. The first housing has one end to be coupled with the base and a side surface formed with a through hole, the elastic force generating assembly being covered inside the first housing with the other end of the force applying board extending out the through hole. The platform is disposed at the other end of the first housing to include the plane facing toward the inside of the first housing and touching the other end of the bumping piece. The handheld powder particle size distribution measuring device is adapted to be coupled with the first housing to cover the upside of the platform to measure the particle size distribution of the dispersed powder on the platform.

In one embodiment, in the disclosed powder particle size distribution measuring equipment, the handheld powder particle size distribution measuring device comprises a second housing having a first end and a second end opposite to the first end with a housing space existing between the first end and the second end, and the second end has an opening which largely falls inside the upper boarder of the first housing after the handheld powder particle size distribution measuring device is coupled to the first housing.

In one embodiment, in the disclosed powder particle size distribution measuring equipment, the handheld powder particle size distribution measuring device comprises a display unit having a screen and being disposed to the first end of the second housing and the screen shows a distribution curve of the measured particle size of the dispersed powder.

In another embodiment, this application discloses a method of measuring powder particle size distribution, it comprises the steps of placing powder under measurement on the plane facing toward the inside of the first housing and touching the other end of the bumping piece; displacing the force applying board to enable the bumping piece to have the first elastic force by which the bumping piece hits the plane to disperse the powder; and measuring particle size distribution of the dispersed powder with the handheld powder particle size distribution measuring device.

In conclusion, according to the powder particle size distribution measuring equipment, powder dispersing device thereof, and method of measuring powder particle size distribution proposed by this application, the powder of agglomeration can be directly and effectively dispersed by the powder dispersing device and the powder dispersing device can be used with a handheld powder particle size distribution measuring device. Furthermore, the handheld powder particle size distribution measuring device can be equipped with a display unit to display the particle size distribution on a screen of the display unit to facilitate the judgement of powder particle size distribution for various different powder at the same time.

BRIEF DESCRIPTION OF DRAWINGS

The following detailed descriptions, given by way of example, and not intended to limit the present invention solely thereto, will be best be understood in conjunction with the accompanying figures.

DETAILED DESCRIPTION OF THE EMBODIMENTS

Figure 1:
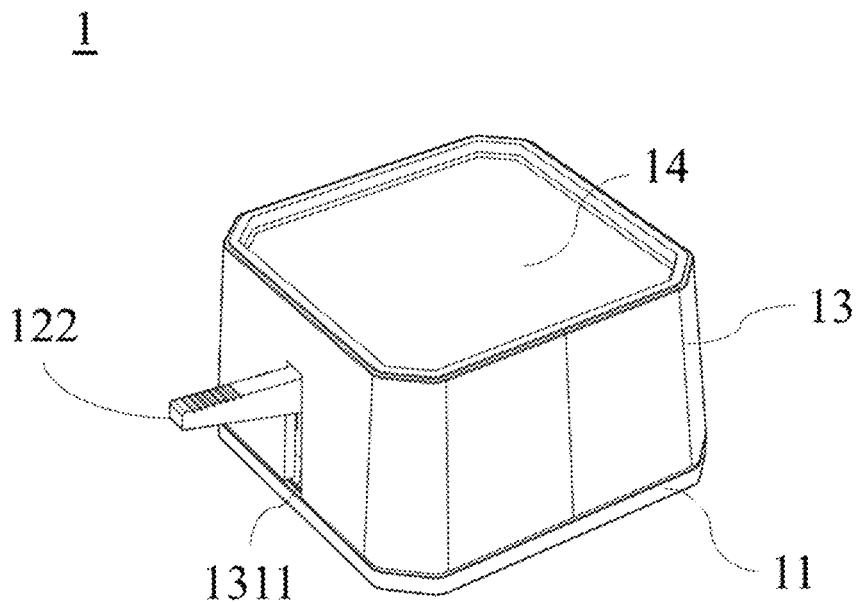
FIG. 1 is a perspective view schematically showing a powder dispersing device of a powder particle size distribution measuring equipment according to one embodiment of the present invention.
Figure 2:
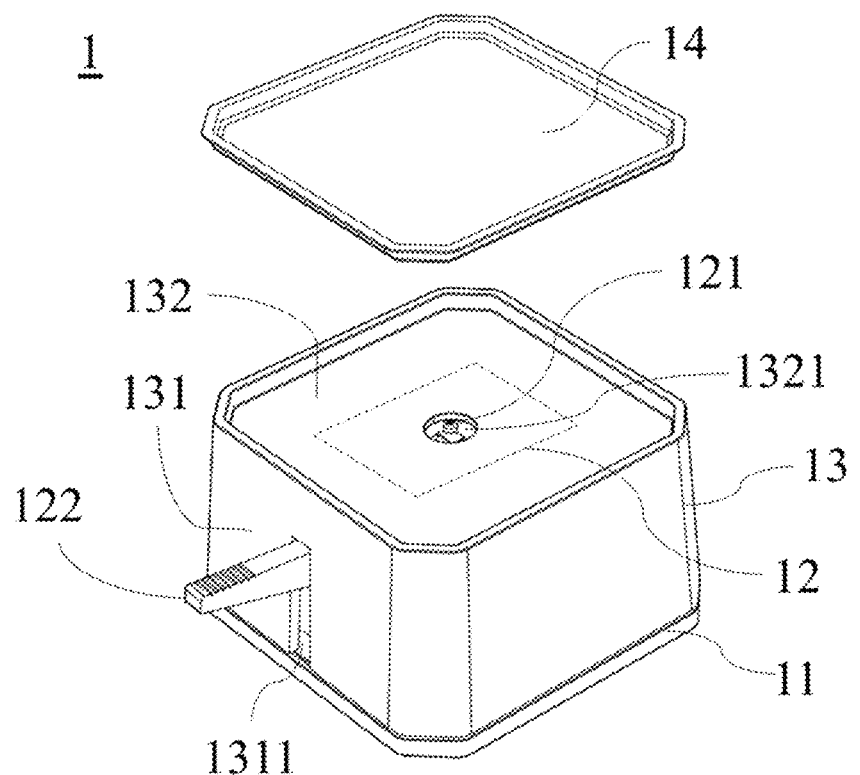
FIG. 2 is a perspective view schematically showing the powder dispersing device of FIG. 1 separating with the tray thereof.
Figure 3:
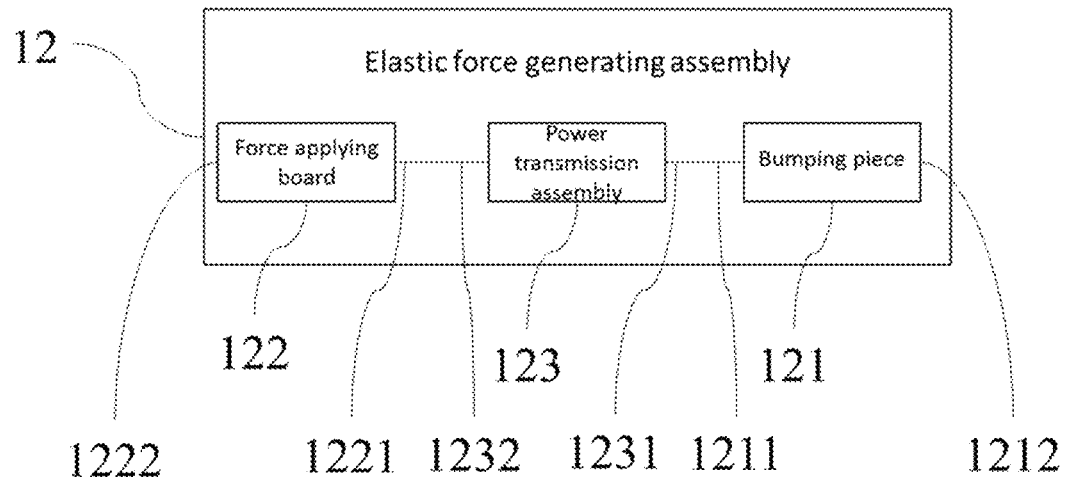
FIG. 3 is a systematic structure schematically showing an elastic force generating assembly of the powder dispersing device of FIG. 1.

FIG. 1 is a perspective view schematically showing a powder dispersing device of a powder particle size distribution measuring equipment according to one embodiment of the present invention. FIG. 2 is a perspective view schematically showing the powder dispersing device of FIG. 1 separating with the tray thereof. FIG. 3 is a systematic structure schematically showing an elastic force generating assembly of the powder dispersing device of FIG. 1. Please refer to the FIG. 1, FIG. 2, and FIG. 3. In one embodiment, a powder dispersing device 1 of a powder particle size distribution measuring equipment comprises a base 11, an elastic force generating assembly 12, a first housing 13, and a tray 14 configured for placing any kind of powder such as coffee powder, flour powder, or milk powder. The elastic force generating assembly 12 is fixed on the base 11 and comprises at least one bumping piece 121, at least one force applying board 122, and a power transmission assembly 123. One end 1231 of the power transmission assembly 123 is connected to one end 1211 of the bumping piece 121 while the other end 1232 of the power transmission assembly 123 is connected to one end 1221 of the force applying board 122. A first displacement applied on the force applying board 122 enables the power transmission assembly 123 to actuate the bumping piece 121 to generate a second displacement and the second displacement enables the bumping piece 121 to have a first elastic force. The first housing 13 has one end which is adaptive to be coupled with the base 11 and has a side surface 131 which is formed with a first through hole 1311. After the first housing 13 is coupled to the base 11, the elastic force generating assembly 12 is covered inside the first housing 13 with the other end 1222 of the force applying board 122 extending out the first through hole 1311. The tray 14 is disposed at the other end of the first housing 13, and one surface of the tray 14 facing toward the inside of the first housing 13 touches the other end 1212 of the bumping piece 121. The first elastic force of the bumping piece 121 triggers the bumping piece 121 to strike on the surface of the tray 14 facing toward the inside of the first housing 13 to disperse the powder put inside the tray 14. In one embodiment, the other end of the first housing 13 has an upper surface 132 which is a closed end and formed with a second through hole 1321. The other end 1212 of the bumping piece 121 passes the second through hole 1321 and extends out of the upper surface 132. The tray 14 is placed on the upper surface 132 of the first housing 13, and the bottom of the tray 14 contacts with the other end 1212 of the bumping piece 121. Then, the bottom of the tray 14 faces toward the inside of the first housing 13, and the first elastic force of the bumping piece 121 triggers the bumping piece 121 to strike on the bottom of the tray 14. In another embodiment, the other end of the first housing 13 is an opening end, and the tray 14 is placed on the first housing 13 with a surface of the tray 14, such as a bottom surface, facing toward the inside of the first housing 13 touches the other end 1212 of the bumping piece 121. On the other hand, the tray 14 may be alternatively replaced with a platform for placing powder and contacting (including point and surface contacting) with the bumping piece 121. Therefore, any platform (such as a leather surface, a pasteboard surface, or a plane attached with a pad for contacting with the bumping piece 121) can be used as the tray 14, and the material, layers, or expression pattern are not limited here by the present invention.

Figure 4:
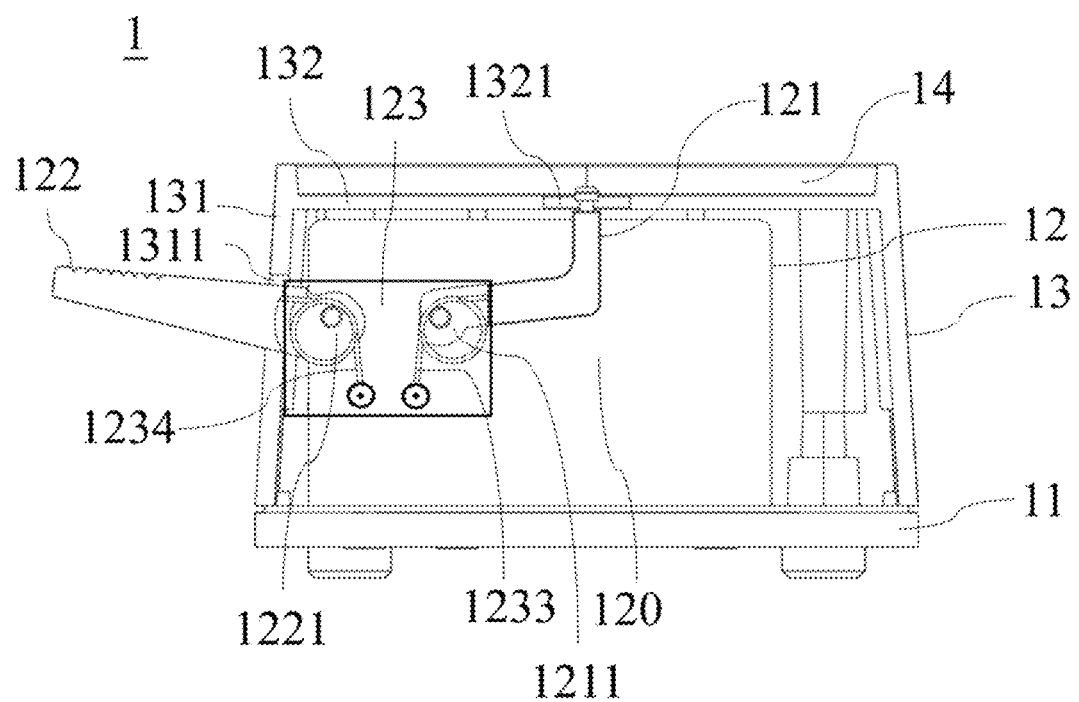
FIG. 4 is a two-dimensional view schematically showing the internal structure of the powder dispersing device of FIG. 1 according to one embodiment.

FIG. 4 is a two-dimensional view schematically showing the internal structure of the powder dispersing device of FIG. 1 according to one embodiment. As shown in FIG. 4, in one embodiment, the one end 1211 of the bumping piece 121 connecting to the power transmission assembly 123 is pivoted to one wall surface 120 of the elastic force generating assembly 12, and the power transmission assembly 123 has a first torsional spring 1233 having one end fixed onto the wall surface 120 of the elastic force generating assembly 12 and the other end fixed onto the bumping piece 121. When a first displacement applied to the force applying board 122 enables the power transmission assembly 123 to actuate the bumping piece 121 to generate a second displacement, the first torsional spring 1233 also goes the second displacement and enables the bumping piece 121 to have a first elastic force. On the other hand, the one end 1221 of the force applying board 122 connecting to the power transmission assembly 123 is pivoted to one wall surface 120 of the elastic force generating assembly 12 and the power transmission assembly 123 has a second torsional spring 1234 having one end fixed onto the wall surface 120 of the elastic force generating assembly 12 and the other end fixed onto the force applying board 122. When the force applying board 122 is applied with a first displacement, the force applying board 122 enables the power transmission assembly 123 to actuate the second torsional spring 1234 to rotate the same first displacement and the second torsional spring 1234 enables the force applying board 122 to have a second elastic force. As a result, when the force originally applied to the force applying board 122 is released, the force applying board 122 will restore to its original position because of the second elastic force. Meanwhile, the bumping piece 121 will rebound and strike on the surface of the tray 14 facing toward the inside of the first housing 13 because of the first elastic force. In the present invention, the embodiment of the elastic force generating assembly 12 is not limited to the one shown in FIG. 4, as long as the entire action of the elastic force generating assembly 12 triggers the bumping piece 121 to rebound and strike on the surface of the tray 14 facing toward the inside of the first housing 13 after making a displacement. All other embodiments of the elastic force generating assembly 12 that can be accomplished by a person skilled in the art of the present invention are also within the scope of the present invention.

Figure 5:
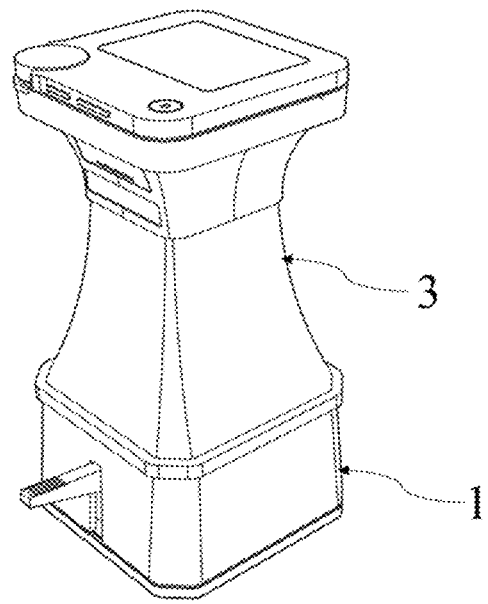
FIG. 5 is a perspective view schematically showing a powder dispersing device of a powder particle size distribution measuring equipment coupled with a handheld powder particle size distribution measuring device according to another embodiment of the present invention.
Figure 6:
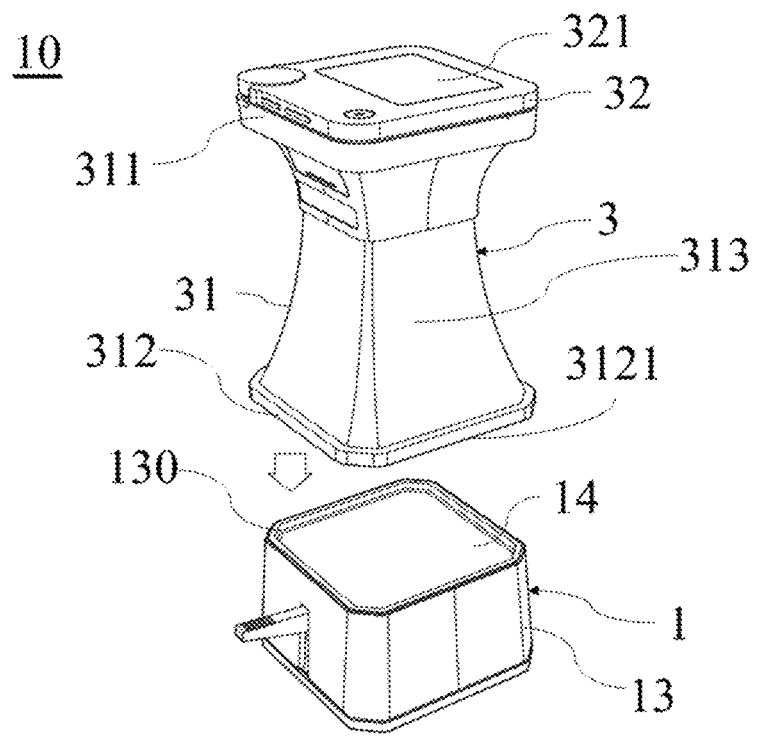
FIG. 6 is a perspective view schematically showing the powder dispersing device of FIG. 5 separating with the handheld powder particle size distribution measuring device.

FIG. 5 is a perspective view schematically showing a powder dispersing device of a powder particle size distribution measuring equipment coupled with a handheld powder particle size distribution measuring device according to another embodiment of the present invention. FIG. 6 is a perspective view schematically showing the powder dispersing device of FIG. 5 separating with the handheld powder particle size distribution measuring device. Please refer to the FIG. 5 and FIG. 6. In another embodiment, a powder particle size distribution measuring equipment 10 includes at least a powder dispersing device 1 shown in FIG. 1 and a handheld powder particle size distribution measuring device 3. The handheld powder particle size distribution measuring device 3 is adapted to be coupled with the first housing 13 of the powder dispersing device 1 to cover the upside of the tray 14 of the powder dispersing device 1 to measure the particle size distribution of the dispersed powder inside the tray 14. Please continue refer to FIG. 6, the handheld powder particle size distribution measuring device 3 comprises a second housing 31 having a first end 311 and a second end 312 opposite to the first end 311 with a housing space 313 existing between the first end 311 and the second end 312, and the second end 312 has an opening 3121 which largely falls inside the upper boarder 130 of the first housing 13 after the handheld powder particle size distribution measuring device 3 is coupled to the first housing 13. Besides, the handheld powder particle size distribution measuring device 3 comprises a display unit 32 having a screen 321 with the display unit 32 being disposed at the first end 311 of the second housing 31 and the screen 321 showing a curve of the measured particle size distribution of the dispersed powder. In this embodiment, the so-called handheld powder particle size distribution measuring device 3 is a device that can be hand carried by anyone with one hand. The powder dispersing device 1 is adapted to be used together with the handheld powder particle size distribution measuring device 3.

Figure 7:
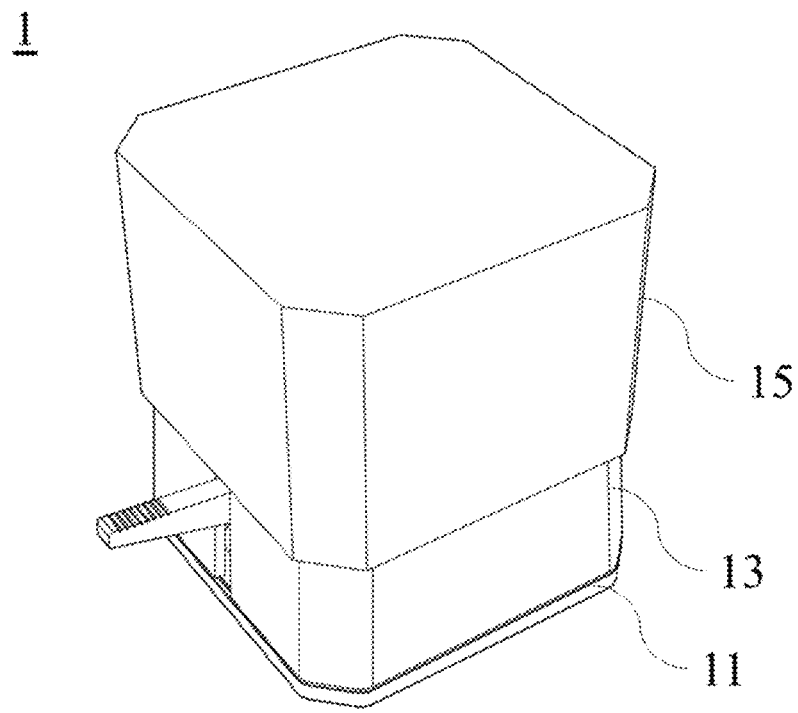
FIG. 7 is a perspective view schematically showing a powder dispersing device of a powder particle size distribution measuring equipment coupled with a cover box according to another embodiment of the present invention.
Figure 8:
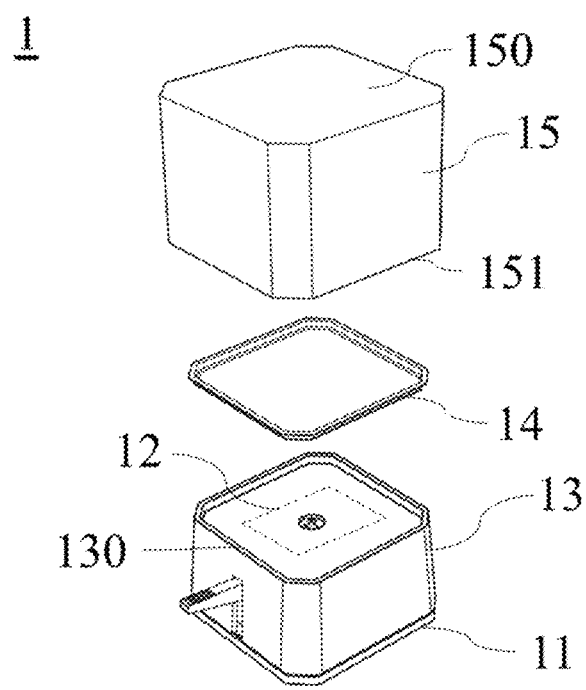
FIG. 8 is a perspective view schematically showing the powder dispersing device separating with a tray and a cover box of FIG. 7.

FIG. 7 is a perspective view schematically showing a powder dispersing device of a powder particle size distribution measuring equipment coupled with a cover box according to another embodiment of the present invention. FIG. 8 is a perspective view schematically showing the powder dispersing device separating with a tray and a cover box of FIG. 7. Please refer to the FIG. 7 and FIG. 8. In one embodiment, the powder dispersing device 1 as shown in FIG. 1 further comprises a cover box 15 having a closed end 150 and an opening end 151 adapted to be coupled with the first housing 13 of the powder dispersing device 1 to covering the upside of the tray 14. The cover box 15 can be used to avoid the powder placed on the tray 14 from flying out of the tray 14 while the bumping piece 121 strikes on the surface of the tray 14 facing toward the inside of the first housing 13. In this embodiment, the opening end 151 of the cover box 15 falls outside the upper boarder 130 of the first housing 13 after the cover box 15 is coupled to the first housing 13. In other embodiments, the opening end 151 of the cover box 15 can also fall inside the upper boarder 130 of the first housing 13 after the cover box 15 is coupled to the first housing 13. In other words, as long as the cover box 15 is able to cover the upside of the tray 14 without allowing the dispersed powder to fly out of the tray 14 after the cover box 15 is coupled to the first housing 13, the shape and size of the opening end 151 is not limited herein.

Figure 9:
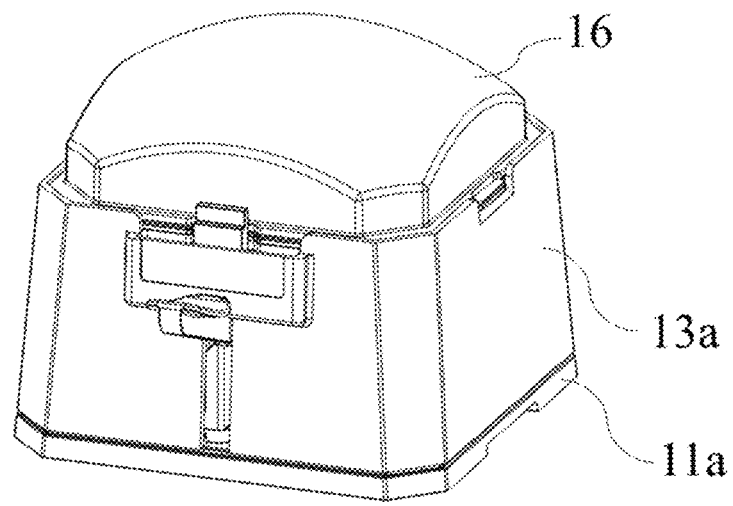
FIG. 9 is a perspective view schematically showing a powder dispersing device of a powder particle size distribution measuring equipment coupled with another cover box according to still another embodiment of the present invention.
Figure 10:
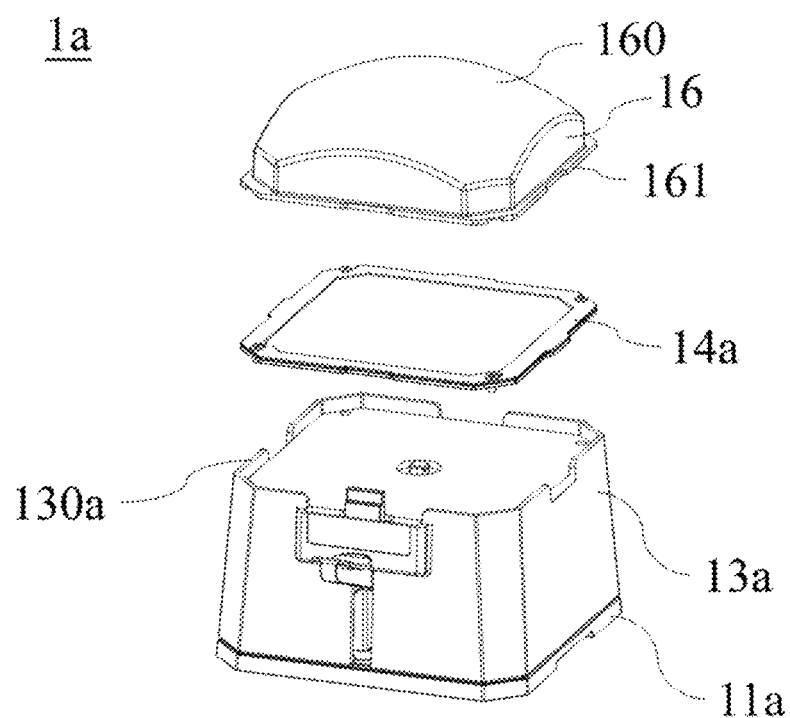
FIG. 10 is a perspective view schematically showing the powder dispersing device separating with a tray and a cover box of FIG. 9.

FIG. 9 is a perspective view schematically showing a powder dispersing device of a powder particle size distribution measuring equipment coupled with another cover box according to still another embodiment of the present invention. FIG. 10 is a perspective view schematically showing the powder dispersing device separating with a tray and a cover box of FIG. 9. Please refer to the FIG. 9 and FIG. 10. In this embodiment, a powder dispersing device 1a is similar to that as shown in FIG. 1 and may have a base 11a and a cover box 16 having a closed end 160 and an opening end 161 adapted to be coupled with the first housing 13a of the powder dispersing device 1a to cover the upside of the tray 14a. The cover box 16 can be used to avoid the powder placed on the tray 14a from flying out of the tray 14a while the bumping piece 121 strikes on the surface of the tray 14a facing toward the inside of the first housing 13a. In this embodiment, it is preferable that the opening end 161 of the cover box 16 falls inside the boarder 130a of the first housing 13a after the cover box 16 is completely coupled to the first housing 13a. As long as the cover box 16 is able to cover the upside of the tray 14a without allowing the dispersed powder to fly out of the tray 14a after the cover box 16 is coupled to the first housing 13a, the shape and size of the opening end 161 is not limited herein. Furthermore, it is to be noted that the closed end 160 is shaped to be downward curved such that the peripheral surface of the closed end 160 surrounding the center surface of the closed end 160 is lower than the center surface of the closed end 160. This configuration helps to allow the powder distributed near the surface edges of the tray 14a to be reflected by the closed end 160 and then fall on the regions near the center of the tray 14a while the bumping piece 121 strikes on the surface of the tray 14a facing toward the inside of the first housing 13a. As a result, a much precise measurement for the particle size distribution of the powder can be made. The closed end 160 may be shaped to have a curve of a sphere, an ellipsoid, or any other curve that is desired and suitable for reflecting the powder to the regions near the center of the tray 14a.

Figure 11:
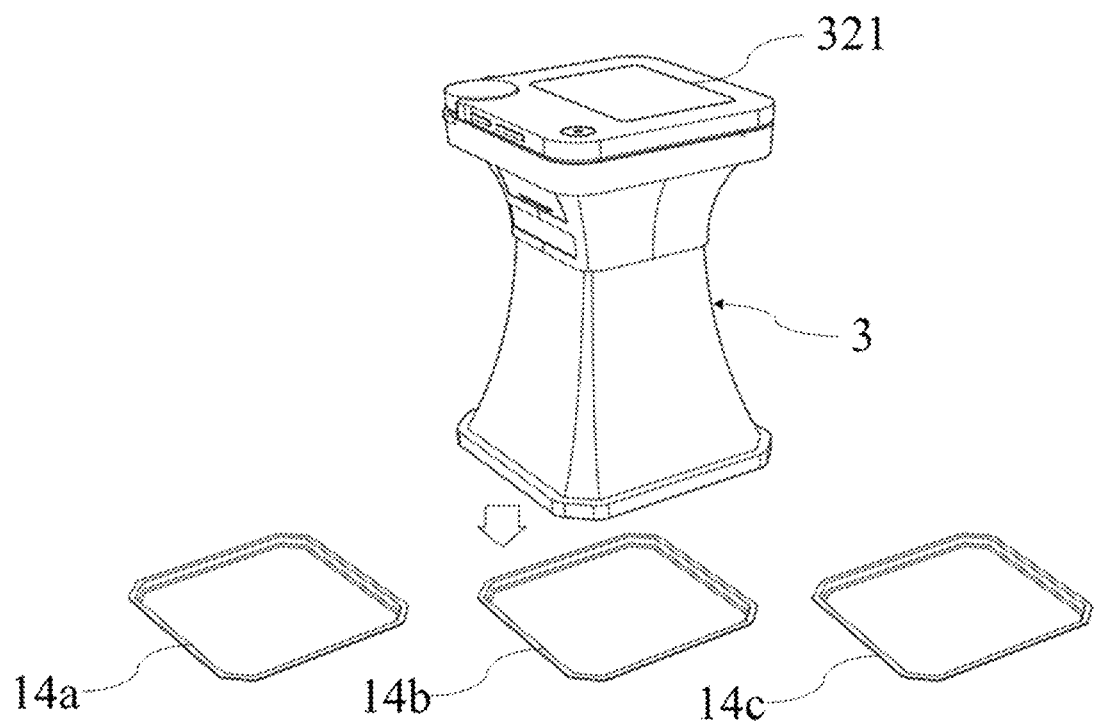
FIG. 11 is a perspective view schematically showing the handheld powder particle size distribution measuring device of FIG. 5 separately coupled with three different trays.

FIG. 11 is a perspective view schematically showing the handheld powder particle size distribution measuring device of FIG. 5 separately coupled with three different trays. Please refer to the FIG. 5, FIG. 7, and FIG. 11. In the FIG. 5, since the handheld powder particle size distribution measuring device 3 is combined together with the powder dispersing device 1, the handheld powder particle size distribution measuring device 3 can directly measure the particle size distribution of powder falling on the tray 14 after the bumping piece 121 strikes on the surface of the tray 14 facing toward the inside of the first housing 13. However, as shown in the FIG. 11, when the handheld powder particle size distribution measuring device 3 is not combined together with the powder dispersing device 1, we can firstly use the powder dispersing device 1 including the cover box 15 of FIG. 7 to separately disperse the powder inside the three different trays 14a, 14b, and 14c and then measure the particle size distribution of powder inside the three different trays 14a, 14b, and 14c with the handheld powder particle size distribution measuring device 3. In this way, the handheld powder particle size distribution measuring device 3 can sequentially record the measured data of particle size distribution for the powder inside the three different trays and make comparison to know the particle size distribution differences between the powder in these trays and then to display a curve of the measured particle size distribution of the powder on the screen 321 of the handheld powder particle size distribution measuring device 3.

Figure 12:
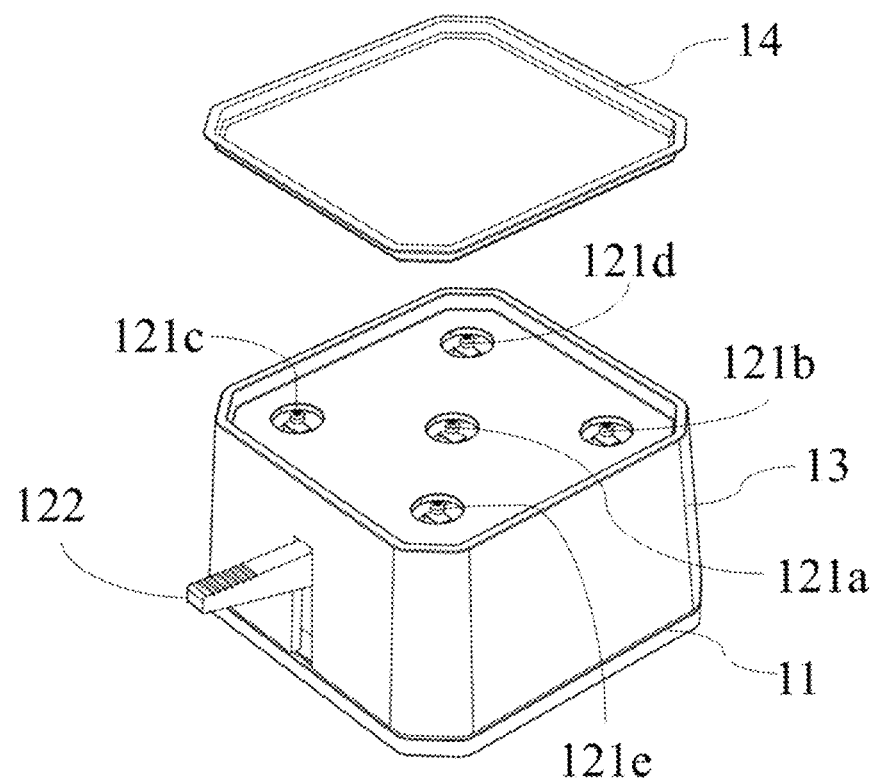
FIG. 12 is a perspective view schematically showing a powder dispersing device of a powder particle size distribution measuring equipment according to another embodiment of the present invention.

FIG. 12 is a perspective view schematically showing a powder dispersing device of a powder particle size distribution measuring equipment according to another embodiment of the present invention. As shown in FIG. 12, in one embodiment, the elastic force generating assembly 12 of the powder dispersing device 1 can have a plurality of bumping pieces to enhance the dispersing effect, for example, such as the five bumping pieces 121a, 121b, 121c, 121d, and 121e disposed respectively at the internal center and four corners of the first housing 13. In this embodiment, as shown in FIG. 12, these bumping pieces 121a, 121b, 121c, 121d, and 121e can be connected to a force applying board 122 through a power transmission assembly 123 as shown in FIG. 3. and enables the power transmission assembly 123 to simultaneously actuate a plurality of bumping pieces 121a, 121b, 121c, 121d, and 121e to make a second displacement and obtain the same elastic force when the force applying board 122 undergoes a first displacement. In other embodiments, the number of bumping pieces can be 2, 3, or 4 and depends on the powder dispersing effect as needed. Therefore, as long as the elastic force of one or more bumping pieces can optimally disperse the powder inside the tray 14, the numbers, action manner, and mutual relationship of the force applying board, the power transmission assembly, and the bumping piece are not limited.

Figure 13:
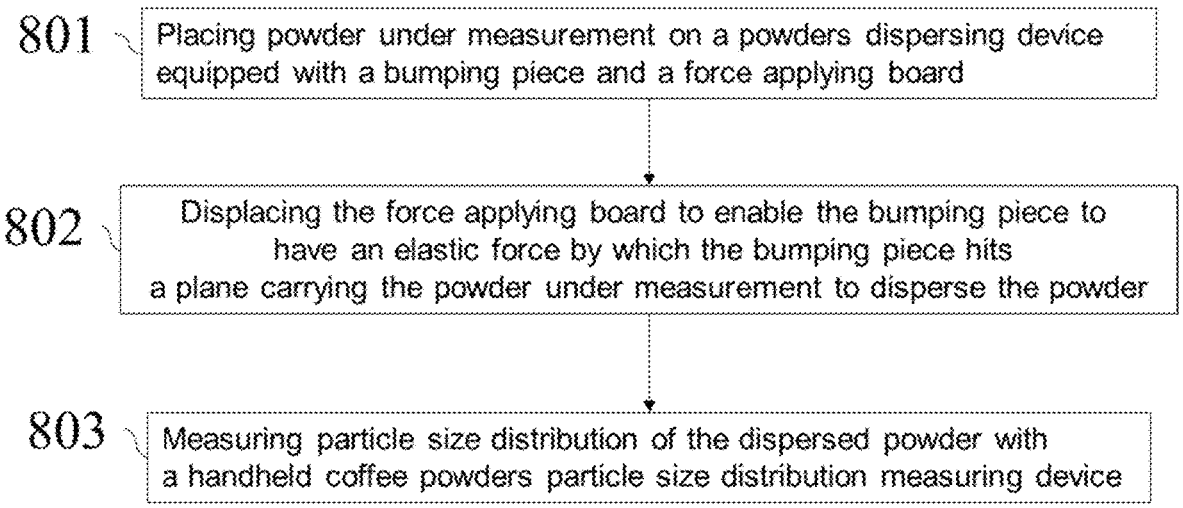
FIG. 13 is a flow chart showing a method of measuring powder particle size distribution according to one embodiment of the present invention.

FIG. 13 is a flow chart showing a method of measuring powder particle size distribution according to one embodiment of the present invention. As shown in FIG. 13, in one embodiment, the method of measuring powder particle size distribution proposed by the present invention comprises the steps as below. Step 801: Placing powder under measurement on a powder dispersing device equipped with a bumping piece and a force applying board. For example, placing powder inside a tray 14 of a powder dispersing device 1 having a bumping piece 121 and a force applying board 122 as shown in FIG. 2. Step 802: Displacing the force applying board to enable the bumping piece to have an elastic force by which the bumping piece hits a plane carrying the powder under measurement to disperse the powder. For example, using a displacement of the force applying board 122 as shown in FIG. 2 to enable the bumping piece 121 to have an elastic force by which the bumping piece 121 hits the bottom of the tray 14 to disperse the powder under measurement inside the tray 14. Step 803: Measuring particle size distribution of the dispersed powder with a handheld powder particle size distribution measuring device. For example, using the handheld powder particle size distribution measuring device 3 as shown in FIG. 5 to measure the particle size distribution of the dispersed powder inside the tray 14.

In conclusion, the proposed powder dispersing device of the powder particle size distribution measuring equipment according to the present application directly and effectively disperse the powder of agglomeration to avoid serious bias of the measured particle size distribution, and also be used with a handheld powder particle size distribution measuring device. Furthermore, a display unit of the handheld powder particle size distribution measuring device can be used to display the particle size distribution on a screen of the display unit to facilitate the judgement of powder particle size distribution.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangement.

What is claimed is:

1. A powder dispersing device of a powder particle size distribution measuring equipment, comprising:
    a base;
    an elastic force generating assembly mounted on the base, comprising:
        at least one bumping piece having one end and an other end,
        at least one force applying board having one end and an other end, and
        a power transmission assembly having one end connected to the one end of the bumping piece and the other end connected to the one end of the force applying board, wherein a first displacement applied to the force applying board enables the power transmission assembly to actuate the bumping piece to generate a second displacement which enables the bumping piece to have a first elastic force; and
    a first housing having one end coupled with the base and having a side surface formed with a through hole, wherein the elastic force generating assembly is covered inside the first housing and the other end of the force applying board extends out the through hole;
    wherein the first elastic force triggers the bumping piece to strike on a plane facing toward the inside of the first housing and touching the other end of the bumping piece.

2. The powder dispersing device of the powder particle size distribution measuring equipment of claim 1, wherein the one end of the bumping piece connected to the power transmission assembly is pivoted to one wall surface of the elastic force generating assembly, the power transmission assembly includes a first torsional spring having one end fixed onto the wall surface of the elastic force generating assembly and an other end fixed onto the bumping piece, and the first elastic force is generated by the second displacement of the first torsional spring.

3. The powder dispersing device of the powder particle size distribution measuring equipment of claim 1, wherein the power transmission assembly enables the force applying board to have a second elastic force when the first displacement is applied.

4. The powder dispersing device of the powder particle size distribution measuring equipment of claim 3, wherein the one end of the force applying board connected to the power transmission assembly is pivoted to one wall surface of the elastic force generating assembly, the power transmission assembly includes a second torsional spring having one end fixed onto the wall surface of the elastic force generating assembly and an other end fixed onto the force applying board, and the second elastic force is generated by the first displacement of the second torsional spring.

5. The powder dispersing device of the powder particle size distribution measuring equipment of claim 1, further comprising a cover box having a closed end and an opening end and being adapted to be coupled with the first housing to cover the upside of the plane facing toward the inside of the first housing and touching the other end of the bumping piece.

6. The powder dispersing device of the powder particle size distribution measuring equipment of claim 5, wherein the opening end of the cover box falls inside the upper boarder of the first housing after the cover box is coupled to the first housing.

7. The powder dispersing device of the powder particle size distribution measuring equipment of claim 5, wherein the closed end is shaped to be downward curved and the peripheral surface of the closed end surrounding the center surface of the closed end is lower than the center surface of the closed end.

8. The powder dispersing device of the powder particle size distribution measuring equipment of claim 7, wherein the closed end is shaped to have a curve of a sphere.

9. The powder dispersing device of the powder particle size distribution measuring equipment of claim 1, wherein the plane facing toward the inside of the first housing and touching the other end of the bumping piece is a bottom surface of a tray disposed at the other end of the first housing.

10. A powder particle size distribution measuring equipment including the powder dispersing device of claim 1, comprising:
    a platform disposed at the other end of the first housing to include the plane facing toward the inside of the first housing and touching the other end of the bumping piece; and
    a handheld powder particle size distribution measuring device adapted to be coupled with the first housing to cover the upside of the platform to measure the particle size distribution of the dispersed powder on the platform.

11. The powder particle size distribution measuring equipment according to claim 10, wherein the handheld powder particle size distribution measuring device comprises a second housing having a first end and a second end opposite to the first end with a housing space between the first end and the second end, and the second end has an opening which largely falls inside the upper border of the first housing after the handheld powder particle size distribution measuring device is coupled to the first housing.

12. The powder particle size distribution measuring equipment according to claim 11, wherein the handheld powder particle size distribution measuring device comprises a display unit having a screen and being disposed to the first end, and the screen shows a distribution curve of the measured particle size of the dispersed powder.

13. A method of measuring powder particle size distribution using the powder particle size distribution measuring equipment of claim 10, comprising:
    placing powder under measurement on the plane facing toward the inside of the first housing and touching the other end of the bumping piece;
    displacing the force applying board to enable the bumping piece to have the first elastic force by which the bumping piece hits the plane to disperse the powder; and measuring particle size distribution of the dispersed powder with the handheld powder particle size distribution measuring device.

\* \* \* \* \*